July 16, 1963  M. O'BRIEN  3,097,460
BULK BIN FILLER
Filed Feb. 6, 1961  4 Sheets-Sheet 2
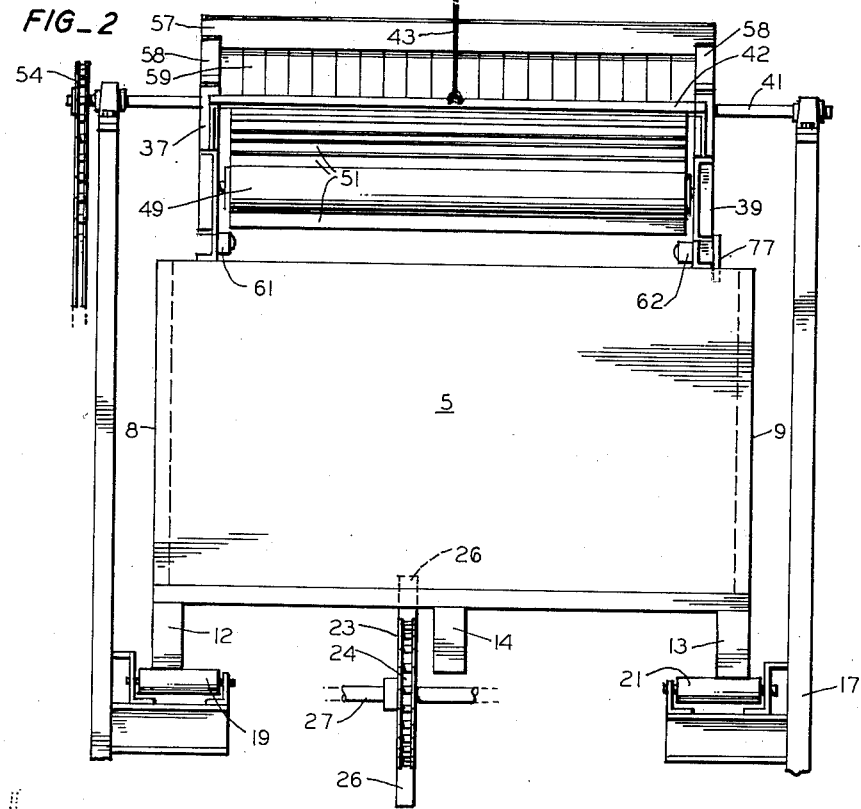
FIG_2
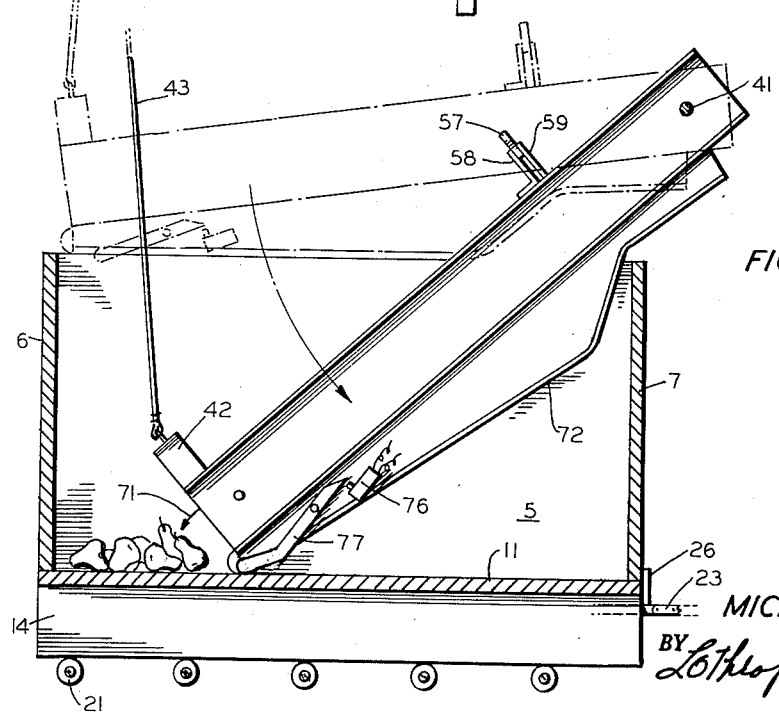
FIG_3
INVENTOR.
MICHAEL O'BRIEN
BY Lothrop & West
ATTORNEYS

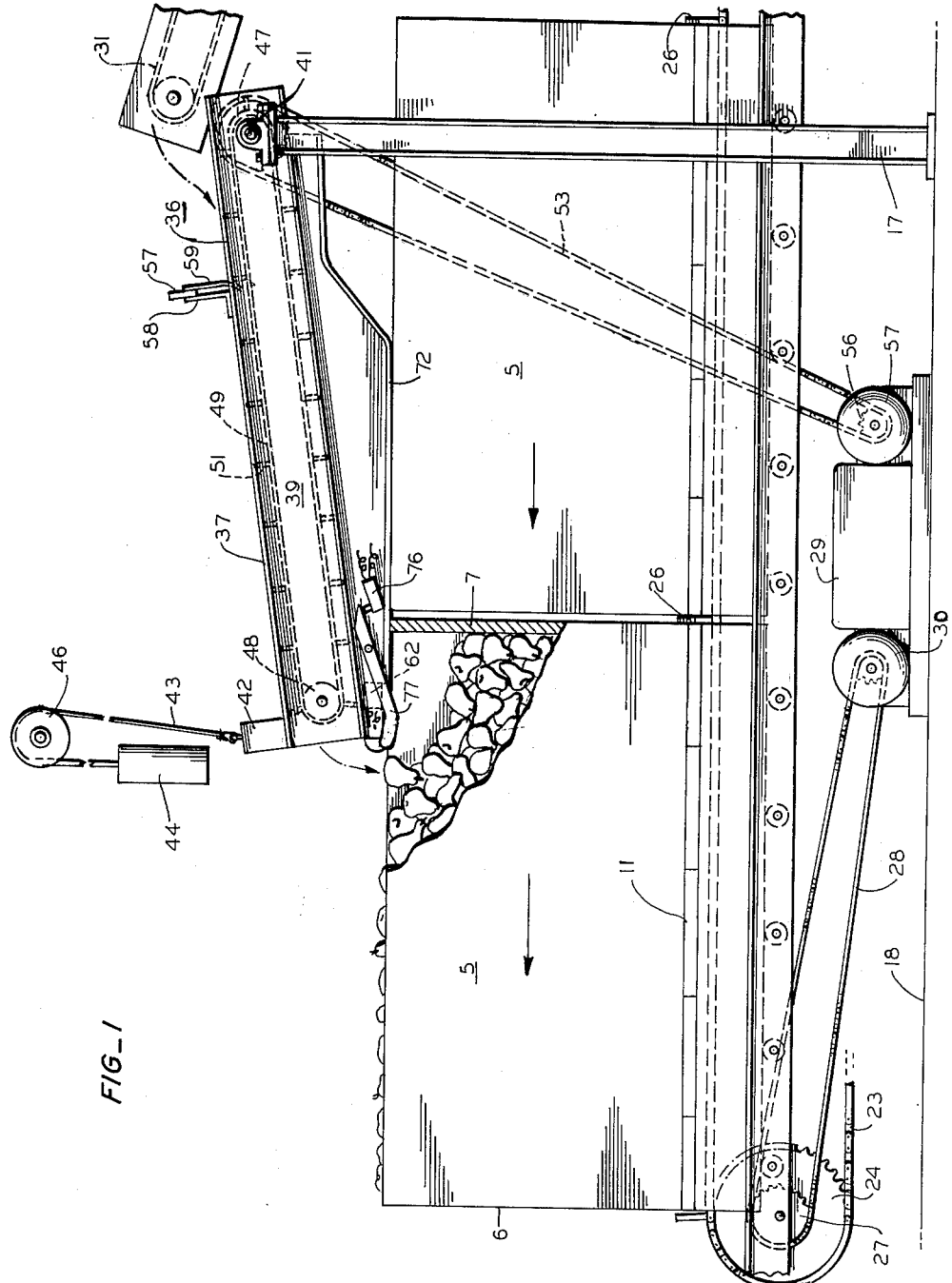

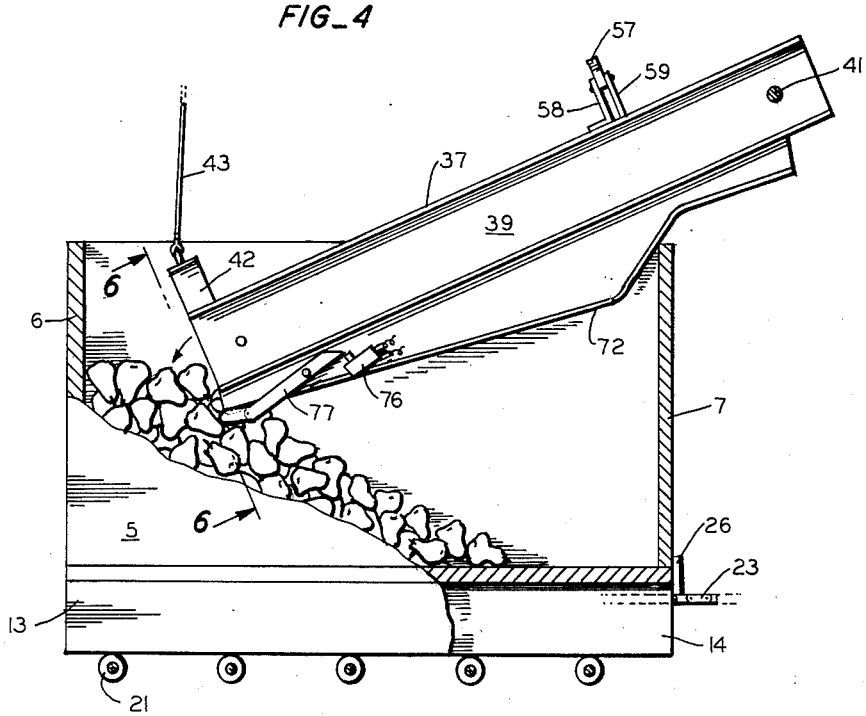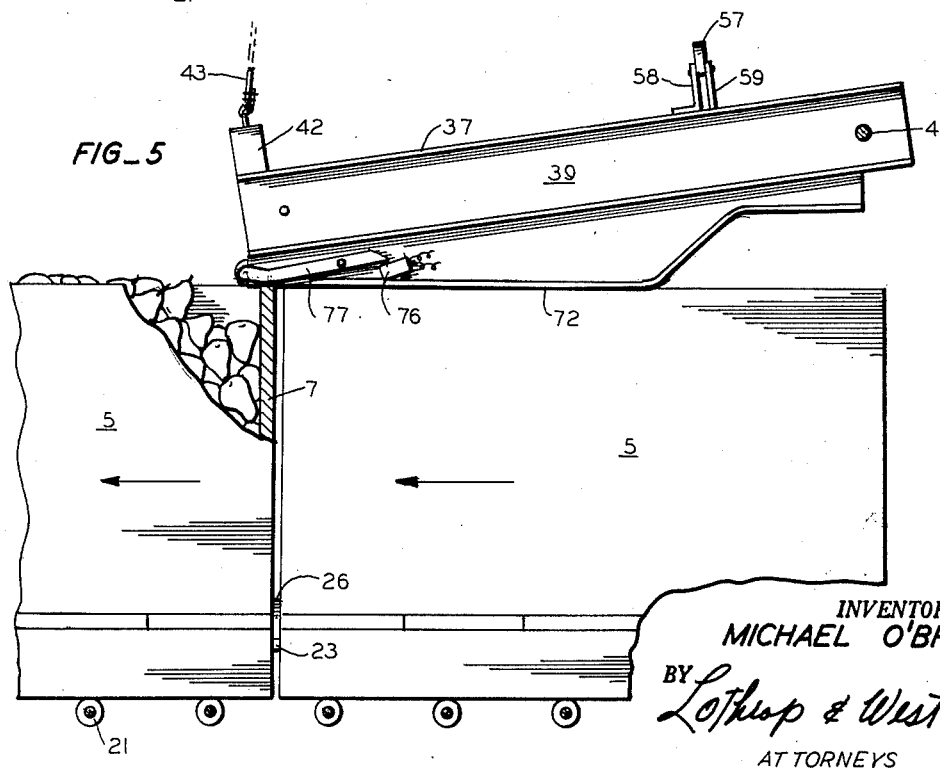

July 16, 1963  M. O'BRIEN  3,097,460
BULK BIN FILLER
Filed Feb. 6, 1961  4 Sheets-Sheet 4
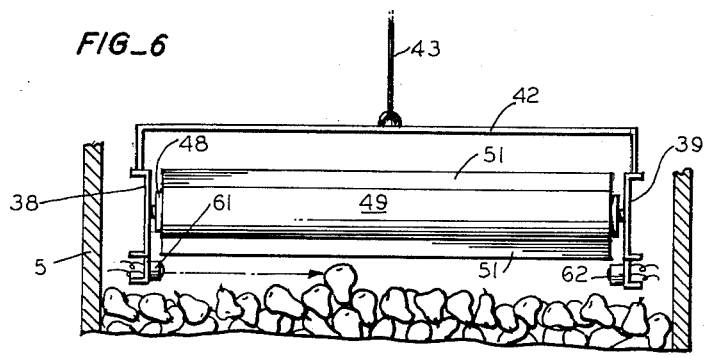
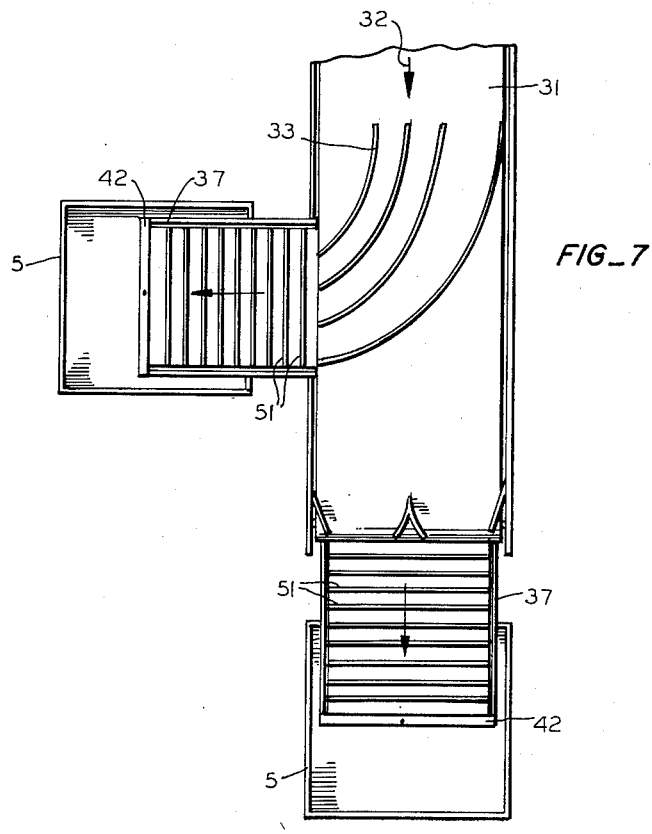
INVENTOR.
MICHAEL O'BRIEN
BY *Lothrop & West*
ATTORNEYS

United States Patent Office 3,097,460
Patented July 16, 1963

3,097,460
BULK BIN FILLER
Michael O'Brien, Davis, Calif., assignor to The Regents of the University of California, Berkeley, Calif.
Filed Feb. 6, 1961, Ser. No. 87,463
12 Claims. (Cl. 53—64)

The invention relates to means primarily useful in handling fruit, or similar materials susceptible to damage by handling, in a fashion so that bruising and contact damage are reduced as much as possible.

In recent years the handling of many commodities, particularly fruit such as pears which has just been picked, has for economic reasons included the use of relatively large bulk bins rather than the former small lug or field boxes. Fruit which is dumped into the relatively large bins must necessarily fall for several feet when the bins are empty or nearly so. This fall into sharp contact with the relatively hard bin materials causes substantial bruising and damage to the fruit so that the fruit must be discarded or downgraded. This is a sizeable economic loss.

It is therefore an object of the invention to provide a bulk bin filler effective to handle the fruit or other commodity gently and without substantial or any bruising or other contact damage.

Another object of the invention is to provide a means for filling a bulk bin with a better distribution of the fruit or other commodity than heretofore.

Another object of the invention is to provide a bulk bin filler which can readily be adapted for use in connection with bulk bins and other handling machinery of the sort now utilized.

A still further object of the invention is to provide a bulk bin filler which operates automatically and with little or no human supervision.

Another object of the invention is to provide a bulk bin filler which is a substantial improvement over comparable devices heretofore available.

A still further object of the invention is to provide a bulk bin filler which smoothly and rapidly handles large quantities of irregular objects, such as fruit in the nature of pears, for example.

Other object together with the foregoing are attained in the embodiment of the invention described in the accompanying description and illustrated in the accompanying drawings in which:

FIGURE 1 is for the most part a side elevation of a bulk bin filler constructed in accordance with the invention, certain portions being broken way to reduce the size of the figure and other parts being shown in partial cross section generally on a vertical plane;

FIGURE 2 is an end elevation of the structure illustrated in FIGURE 1;

FIGURE 3 is an elevation on a longitudinal vertical plane of a portion of the bulk bin filler showing the fruit conveyor in an extreme lower position;

FIGURE 4 is a view similar to FIGURE 3 but showing the mechanism in a later stage of advance with the fruit conveyor in an intermediate position;

FIGURE 5 is a view comparable to FIGURES 3 and 4 but showing the fruit conveyor in its uppermost position;

FIGURE 6 is a detail in transverse section showing the leading end of the fruit conveyor; and FIGURE 7 is a plan of a portion of the associated mechanism and two versions of feed mechanism for the bulk bin filler.

While the device disclosed is readily adaptable to many different environments and usages, it is treated herein as it has actually been utilized in connection with the handling of pears in bulk bins of the sort presently widely used in the industry.

The bulk bin 5 itself is a generally rectangular, open top wooden container having a leading wall 6, a trailing wall 7, a pair of side walls 8 and 9 and a floor 11 or bottom. Certain supporting beams 12 and 13 are arranged at the sides of the bulk bin below the bottom 11 and usually there is also a center beam 14. The arrangement is such that the forks of a fork lift truck can be engaged under the bottom 11 between the side beams 12 and 13 so that the bulk bin can readily be individually transported.

A series of bulk bins, each like the bin 5, is arranged in sequence for propulsion forwardly on and with respect to a frame 17 arranged above a suitable support 18 such as a floor. The frame 17 includes the customary structural shapes and is particularly arranged with a number of antifriction rollers 19 and 21 arranged in rows on opposite sides of the mechanism and in position directly to engage the beams 12 and 13 and so support the bulk bins 5.

The arrangement is designed for advancement of the bulk bins 5 in accordance with a particular scheme. For that reason there is also mounted on the frame 17 a bin conveyor including a looped chain 23 arranged around a drive sprocket 24. At intervals on the chain 23 upstanding cleats 26 are positioned for engagement with a portion of the adjacent bulk bin. The drive sprocket 24 is disposed on a cross shaft 27 journalled in the framework and designed to be driven through a drive chain 28 from an electric drive motor 30 connected through a suitable control device 29.

The bulk bins 5 supported on the rollers 19 and 21 follow each other in sequence and are advanced by the cleats 26 of the drive mechanism as the drive mechanism is appropriately energized. A suitable supply of empty bins is received on the frame 17 at the right end of FIGURE 1, whereas the filled bins are advanced and withdrawn from the left end of the mechanism as shown in FIGURE 1. The bin supply devices and the bin removing devices are standard and are not disclosed in detail.

The supply of fruit for the filler mechanism is received on a conveyor belt 31 (FIGURE 7) on the frame 17 with the fruit advancing in random arrangement in the direction of the arrow 32. Two different delivery devices can be utilized with this structure. With one device, the fruit is laterally diverted from the conveyor 31 by means of curved distribution dividers 33. These are arranged in such a way that the fruit from the conveyor 31 is diverted in a plurality of channels and in curved paths to discharge over the side of the conveyor belt 31. As an alternative distribution device, the dividers 33 can be entirely omitted. In this instance, the fruit on the conveyor 31 continues to advance in a straight line and is discharged over the conveyor end. As shown particularly in FIGURE 1, the end discharge from the conveyor 31 is utilized for description herein, although in many instances the side discharge as illustrated in FIGURE 7 is preferred.

Fruit advancing on the conveyor 31 is discharged therefrom and is received with very little fall on a fruit conveyor 36. The fruit conveyor framework 37 has a pair of side channels 38 and 39 at one end mounted on a cross shaft 41 for pivotal or swinging movement in a vertical plane. The width of the framework 37 is slightly less than the inside width of the bin 5. At the other end the channels 38 and 39 are joined by a yoke 42 connected through a cable 43 to a counterweight 44. The cable 43 is trained over a pulley 46 on any suitable overhead support not shown. The weight 44 partly but not entirely counterbalances the conveyor 36, the variable leverage being such that the conveyor easily drops from the horizontal but strikes the bin bottom gently and tends to remain there.

Included in the fruit conveyor mechanism and trained around a drive drum 47 concentric with the shaft 41 and also trained around an idler drum 48 is a belt 49 having a plurality of upstanding cross cleats 51 or flights thereon. The height of the cleats is such that they are well within the bounds of the side walls of the channels 38 and 39. The fruit conveyor 49 is appropriately driven by a chain 53 engaging a sprocket 54 (FIGURE 2) at one end of the shaft 41 and also engaging a sprocket 56 on a drive mechanism 57.

Fruit from the conveyor 31 discharged onto the conveyor belt 49 is carried forwardly under a flexible guard mechanism 57. This includes an arch 58 extending crosswise of the fruit conveyor framework and having a plurality of depending rubber fingers 59 so that any fruit which tends to ride too high or to roll is brushed into a succeeding compartment between the successive cleats 51. A single layer of fruit continues along the conveyor. Since the fruit conveyor is not entirely counterbalanced, it is inclined as shown in FIGURE 3 unless otherwise constrained and so is disposed within a leading empty bin 5 when started. The forward end of the conveyor belt 49 is close to the floor 11 of the bin so that fruit discharging over the forward end of the conveyor belt 49 is gently deposited in the leading corner of the bin. Since the width of the fruit conveyor is only slightly less than the width of the bin itself, a discharge of the fruit with a reasonably uniform transverse distribution is made.

Pursuant to the invention, special means are provided for affording interrelated motion of the fruit conveyor 36 and of the bin 5. For that reason there is provided in a leading location on the fruit conveyor 36 a means responsive to material within the bin 5 for altering the space relationship between the fruit conveyor and the bin. On one leading edge of the framework 37, for example at the leading edge of the channel 38, there is provided a source 61 of light such as an electric light globe. There is appropriately mounted out of the path of the fruit initially discharging from the end of the conveyor 36 and in a location so that light from the source can travel directly across or transversely of the fruit conveyor for reception by a photoelectric cell 62. This or a comparable light sensitive device is mounted at the leading lower portion of the other fruit conveyor channel 39.

The electric circuitry for the light source 61 and for the responsive device 62 is standard and is not illustrated in detail. When light from the source 61 is received by the sensitive device 62, the situation is normal and no particular event is triggered. When the light beam between the source 61 and the receptor 62 is interrupted, then the control mechanism 29 is actuated for a predetermined time interval only. The drive motor 30 is coupled to or effective upon the conveyor chain 23 for a short interval of time.

The pears discharging directly over the end of the conveyor belt 49 travel in a path 71 above and forwardly of the light beam and so do not interrupt it. But as soon as sufficient subsequently discharged material piles up in the leading lower corner of the bin, then finally one or more of the pears rolls back down the inclined face of the pile, or lodges thereon in a position between the source 61 and the sensitive device 62, interrupting the light beam. The corresponding current interruption causes the chain 28 to be driven for a short, predetermined interval of time. A standard, adjustable time delay device is used for this purpose. The chain drive then causes the conveyor chain 23 to advance and moves the bin 5 forwardly for a short, predetermined distance. The timing device then interrupts the advancement of the conveyor and the conveyor again stops with the bin in a predetermined advanced location. A typical advance is of the order of two inches.

Means are provided for changing the location of the fruit conveyor within the bin not only in a horizontal sense but also in a vertical sense as the bin advances. The frame 37 of the fruit conveyor includes a pair of cams 72, one on each side of the device immediately subjacent the channels 38 and 39. The contour of the cams 72 is such that when they are engaged by the upper edge of the trailing wall 7 of the leading bin 5, the fruit conveyor framework 37 is cammed upwardly as the chain conveyor 23 advances the bin. Thus the fruit conveyor structure is moved from the lower position shown in FIGURE 3, for example, through intermediate positions to a central position substantially as shown in FIGURE 4. While the bin remains stationary in this position of advance, the fruit conveyor remains stationary at this angularity or elevation while additional fruit is deposited in the bin. The fruit deposit continues until such time as the fruit rolling backwardly down the rearward slant face of the deposited pile again interrupts the light beam. The bin 5 is then advanced another short forward step and concurrently cams the fruit conveyor upwardly to another raised position.

The succession of small advancing movements of the bin and the corresponding increasing elevation of the fruit conveyor continue until such time as the parts are approximately in the fully raised position as shown in FIGURE 1, for example. The fruit conveyor is not cammed or raised any higher, but the bin does advance when the light beam is interrupted. During this final advancing step of the bin, an electrical switch 76 mounted on one side of the fruit conveyor framework is actuated by a lever 77. The lever is abutted by or cams on the trailing wall 7 of the advance bin 5 and on the leading wall of the next succeeding bin.

The switch 76 controls the drive mechanism 57 for the fruit conveyor and momentarily interrupts the advance of the belt 49 so that no further fruit is discharged therefrom until the fruit conveyor has ridden over the leading edge of the next succeeding bin 5 and has dropped by gravity into its initial loading position, as shown in FIGURE 3. Just after the lever 77 has ridden over the leading edge of the next succeeding bin, the switch 76 returns to its former condition, the drive 57 is energized and fruit again begins to be carried downwardly along the fruit conveyor to be deposited in the leading bottom portion of the next and now leading bin 5, as shown in FIGURE 3.

With this mechanism, the fruit is carefully lowered on the steeply inclined fruit conveyor and is laid or gently placed in the leading portion of the empty bin. As the bin begins to fill, a fruit rolling backwardly on or projecting rearwardly from the inclined pile interrupts the light beam so that the bin is advanced slightly and the fruit conveyor is slightly raised. This operation is frequently repeated so that there is an even, gentle and careful distribution of fruit within the bin. When the bin is substantially full, the bin is finally advanced and the conveyor overrides the adjacent trailing and leading edges of the adjacent bins and falls into the primary discharge position in the successive bin. As the conveyor is passing over the adjacent bin edges and dropping to the bottom of the succeeding bin, the fruit discharge is momentarily interrupted by actuation of the switch 77, which also causes the bins to move forward during this time.

The entire handling of the fruit is accomplished automatically and the fruit is never dropped more than a very short and inconsequential distance. It has been found as a matter of practice with certain fruits such as pears that bruising and damaging due to handling in this portion of the packing operation have been reduced in the neighborhood of fifteen to twenty percent and the other objects of the invention have been substantially attained.

What is claimed is:

1. A bulk bin filler comprising a frame, a bin support on said frame, means for advancing a bin on said support, a fruit conveyor, means for mounting said fruit conveyor on said frame to swing into and out of said bin, means actuated by fruit in said bin for operating said bin advancing means, and means operated by advancement of said bin on said support for swinging said fruit conveyor out of said bin.

2. A bulk bin filler comprising a frame, a bin support on said frame, means for advancing a bin step-by-step on said support, a fruit conveyor, means for mounting said fruit conveyor on said frame for movement downwardly into said bin and upwardly out of said bin, means actuated by fruit in said bin for operating said bin advancing means one step at a time, and means operated by advancement of said bin one step for moving said fruit conveyor upwardly a predetermined amount.

3. A bulk bin filler comprising a frame, means for supporting a bin for advancement on said frame, a fruit conveyor, means for mounting said fruit conveyor on said frame for movement into and out of said bin, means for advancing said bin on said frame, means for moving said fruit conveyor in response to the advancement of said bin on said frame, and means actuated by fruit in said bin for controlling said bin advancing means.

4. A bulk bin filler comprising a frame, means for supporting a bin for advancement on said frame, a fruit conveyor having a free end, means for mounting said fruit conveyor on said frame for swinging movement of said free end within said bin between the top and the bottom thereof, means for advancing said bin on said supporting means, means for swinging said fruit conveyor in response to the advancement of said bin on said supporting means, and means actuated by fruit in said bin for controlling said advancing means.

5. A bulk bin filler comprising a frame, means for supporting a bin for advancement on said frame, a bin conveyor for advancing said bin relative to said frame, a fruit conveyor having a free end, means for mounting said fruit conveyor on said frame for movement of said free end into and out of said bin, means including a cam on said fruit conveyor adapted to be engaged by an edge of said bin for establishing the position of said free end relative to said bin, and means actuated by fruit in said bin for controlling the operation of said bin conveyor.

6. A bulk bin filler comprising a frame, means on said frame for supporting a bin for advancement on said frame, means on said frame for delivering fruit to a location within said bin, means for simultaneously advancing said bin on said frame and for causing said bin to move said delivering means between one location adjacent the bottom of said bin and another location above said bin, and means actuated by fruit within said bin for controlling said advancing means.

7. A bulk bin filler comprising a frame, means on said frame for supporting a bin having a transverse wall for advancement on said frame, a bin conveyor for advancing said bin relative to said frame, a fruit conveyor having a free end, means for mounting said fruit conveyor on said frame for movement of said free end between one location adjacent the bottom of said bin and another location above said bin, and a cam on said fruit conveyor and engageable by said transverse wall of said bin for moving said fruit conveyor free end in accordance with advancement of said bin.

8. A bulk bin filler comprising a frame, means on said frame for supporting a bin for advancement on said frame, a bin conveyor for advancing said bin relative to said frame, electrical means for operating said bin conveyor, a fruit conveyor, means for mounting said fruit conveyor on said frame for downward movement into said bin and upward movement out of said bin, means for moving said fruit conveyor upward in accordance with the advancement of said bin, and an electrical means operated by fruit in said bin adjacent said fruit conveyor for controlling said electrical means for operating said bin conveyor.

9. A bulk bin filler comprising a frame, means for supporting a bin on said frame, a fruit conveyor including a conveyor belt, means for mounting said fruit conveyor on said frame for movement into said bin and out of said bin over an edge thereof, means for operating said conveyor belt, and means actuated by said edge for stopping said conveyor belt operating means.

10. A bulk bin filler for use with an open top bin having a leading edge and a trailing edge and a bottom comprising a fruit conveyor; means for mounting said fruit conveyor to move in a vertical plane; means for advancing said bin relative to said fruit conveyor; and means on said conveyor adapted to abut said leading edge, said bottom and said trailing edge as said bin advances for moving said fruit conveyor in a path extending from said leading edge to said bottom and then to said trailing edge.

11. A bulk bin filler for use with an open top bin having transverse walls comprising a frame, means for advancing said bin on said frame, a fruit conveyor having a free end, and means including a cam on said fruit conveyor engaging said transverse walls of said bin for moving said conveyor relative to said bin in a path extending from one upper edge of one transverse wall of said bin to the bottom of said pin and then to another upper edge of another transverse wall of said bin.

12. A device as in claim 11 in which said bin advancing means is controlled by fruit within said bin.

References Cited in the file of this patent

UNITED STATES PATENTS

| | | |
|---|---|---|
| 2,889,676 | Griffith | June 9, 1959 |
| 2,896,384 | Carlsen et al. | July 28, 1959 |
| 2,925,162 | De Tuncq | Feb. 16, 1960 |
| 2,956,382 | Wardell | Oct. 18, 1960 |

FOREIGN PATENTS

| | | |
|---|---|---|
| 459,899 | Great Britain | Jan. 18, 1937 |